(12) United States Patent
Watson et al.

(10) Patent No.: US 7,253,400 B2
(45) Date of Patent: Aug. 7, 2007

(54) CALIBRATION OF INFRA RED CAMERAS

(75) Inventors: Norman Frederick Watson, Edinburgh (GB); Michael Grant McGuigan, Edinburgh (GB)

(73) Assignee: Selex Sensors and Airborne Systems Limited, Basildon (GB)

( * ) Notice: Subject to any disclaimer, the term of this patent is extended or adjusted under 35 U.S.C. 154(b) by 65 days.

(21) Appl. No.: 10/506,789

(22) PCT Filed: Mar. 4, 2003

(86) PCT No.: PCT/GB03/00934
§ 371 (c)(1),
(2), (4) Date: Sep. 7, 2004

(87) PCT Pub. No.: WO03/076885
PCT Pub. Date: Sep. 18, 2003

(65) Prior Publication Data
US 2005/0092926 A1    May 5, 2005

(30) Foreign Application Priority Data
Mar. 8, 2002    (GB) ................... 0205484.9

(51) Int. Cl.
*G01D 18/00* (2006.01)
(52) U.S. Cl. .................................. 250/252.1

(58) Field of Classification Search .............. 250/252.1
See application file for complete search history.

(56) References Cited

U.S. PATENT DOCUMENTS

| | | | |
|---|---|---|---|
| 4,387,301 A | 6/1983 | Wirick et al. | |
| 4,933,555 A * | 6/1990 | Smith .......................... | 250/330 |
| 5,128,514 A | 7/1992 | Lehmann et al. | |
| 5,298,752 A | 3/1994 | Wight | |
| 5,572,312 A | 11/1996 | Karlsson et al. | |
| 5,602,389 A * | 2/1997 | Kato et al. ............... | 250/252.1 |
| 5,693,940 A | 12/1997 | Botti et al. | |
| 5,838,016 A | 11/1998 | Johnson | |
| 6,476,392 B1 * | 11/2002 | Kaufman et al. ........... | 250/332 |

FOREIGN PATENT DOCUMENTS

| | | |
|---|---|---|
| DE | 195 49 310 A1 | 12/1995 |
| EP | 0 316 103 A | 5/1989 |
| GB | 2 184 861 A | 7/1987 |
| WO | WO 99/23516 | 5/1999 |

* cited by examiner

*Primary Examiner*—David Porta
*Assistant Examiner*—Mindy Vu
(74) *Attorney, Agent, or Firm*—Crowell & Moring LLP

(57) ABSTRACT

A reference surface for calibrating cooled infra red detectors includes a plurality of corner cube units which reflect radiation incident directly on them. The surface of each corner cube unit is partially reflective and partially emissive such that, when imaged by a cryogenically cooled detector, the reference surface appears as a black body source at a lower temperature than the actual temperature thereof.

11 Claims, 4 Drawing Sheets

CALIBRATION OF INFRA RED CAMERAS

The present invention relates to improvements in or relating to the calibration of infra red (IR) cameras and is more particularly concerned with the calibration of such cameras employing cryogenically cooled detector elements.

Such cameras typically employ a plurality of detector elements in the form of a focal plane array (FPA) on which an image of the scene is focussed. However alternative configurations, such as a multi-element linear array, or a single element detector, over which an image of the scene is scanned, are also known.

Data from the detector element(s) may be used to create a visible image on a display such as a TV monitor. This is analogous to a conventional visible light TV image, but where image intensity in different parts of the scene is a function of detected IR radiance, rather than visible light radiance from the corresponding part of the scene.

Individual detector elements exhibit variations in their sensitivity to incident radiation (flux), and in the offset, or "bias", of their outputs as a function of time and operating conditions. The variations in sensitivity may represent changes in the non-linearity in output as a function of flux, and, as such, are dependent on flux level which, in-turn, depends on the temperatures of the elements comprising the scene being viewed. In cameras with a multi-element detector, this variability causes a non-uniform response to any given IR intensity level. This non-uniformity creates noise or artefacts across the resulting image which are highly undesirable.

Detectors may be required to produce numerical outputs which accurately represent the IR flux falling on the detector. This is also compromised by the variations in detector performance.

It is known to calibrate IR cameras by taking readings from each element when one or more reference surfaces at different temperatures are presented to the camera. These readings are then used to calibrate the camera. For robust and accurate calibration, it is necessary to present surfaces generating flux levels covering the range of those which may be encountered in the scenes to be imaged. However, the provision of a sufficiently cold reference surface to generate the low flux levels equivalent to scenes often encountered in practice requires substantive cooling of the reference surface. This can be expensive and difficult to achieve.

It is therefore an object of the present invention to provide a calibration system which overcomes the need to cool the reference surface.

In accordance with one aspect of the present invention, there is provided an infra red detector calibration system comprising a reference surface which comprises a plurality of hollow corner cubes which are partially reflective and partially emissive, temperature controlling means adapted to maintain the reference surface at a desired calibration temperature, processing means for receiving an output signal generated by an infrared detector at said the desired calibration temperature, comparing said detector output signal with a predetermined ideal output signal for said desired calibration temperature and calculating a calibration coefficient on the basis of the difference between the detector output signal and the ideal output signal at said desired calibration temperature.

In accordance with another aspect of the present invention, there is provided a method of calibrating an infra red detector comprising a plurality of detector elements, the method comprising:

presenting a reference surface at a known temperature to an infra red detector;

measuring the output of each detector element;

comparing the measured output of each detector element with a nominal output for the known reference surface temperature to determine a calibration error at the known temperature; and heating the reference surface to one or more further known temperatures and repeating steps b) and c) to determine a calibration errors for each of the further known temperatures.

For a better understanding of the present invention, reference will now be made, by way of example only, to the accompanying drawings in which.

In accordance with the present invention, a reference surface is provided which, when viewed by a cryogenically cooled detector, can produce the radiance equivalent to that of a lower temperature black body. This allows calibration of an infra red (IR) camera for cold scenes without the necessity of cooling the surface to the actual black body temperature.

The present invention provides a partially reflective, partially emissive surface which presents the equivalent radiance of a relatively cold back body, for example, at 0° C., at equipment operating temperatures, typically at room temperature or above. The surface can be used for calibration of a cooled IR focal plane array (FPA) detector.

A simple plain surface of N % emissivity reflects surrounding hot metalwork at 100-N %, such that it is impossible to achieve a low overall radiance simply by altering the emissivity of the surface. To do so, it is necessary to cool the surface. By utilising a corner-cube patterned surface, it is possible to substantially eliminate reflections off hot (or ambient temperature) metalwork, reflecting only the temperature of the cold FPA which is typically at 77K. As N % of the patterned surface is still emissive, it is possible to control the equivalent temperature of the surface (above 77K) by heating the surface.

Figure 1:
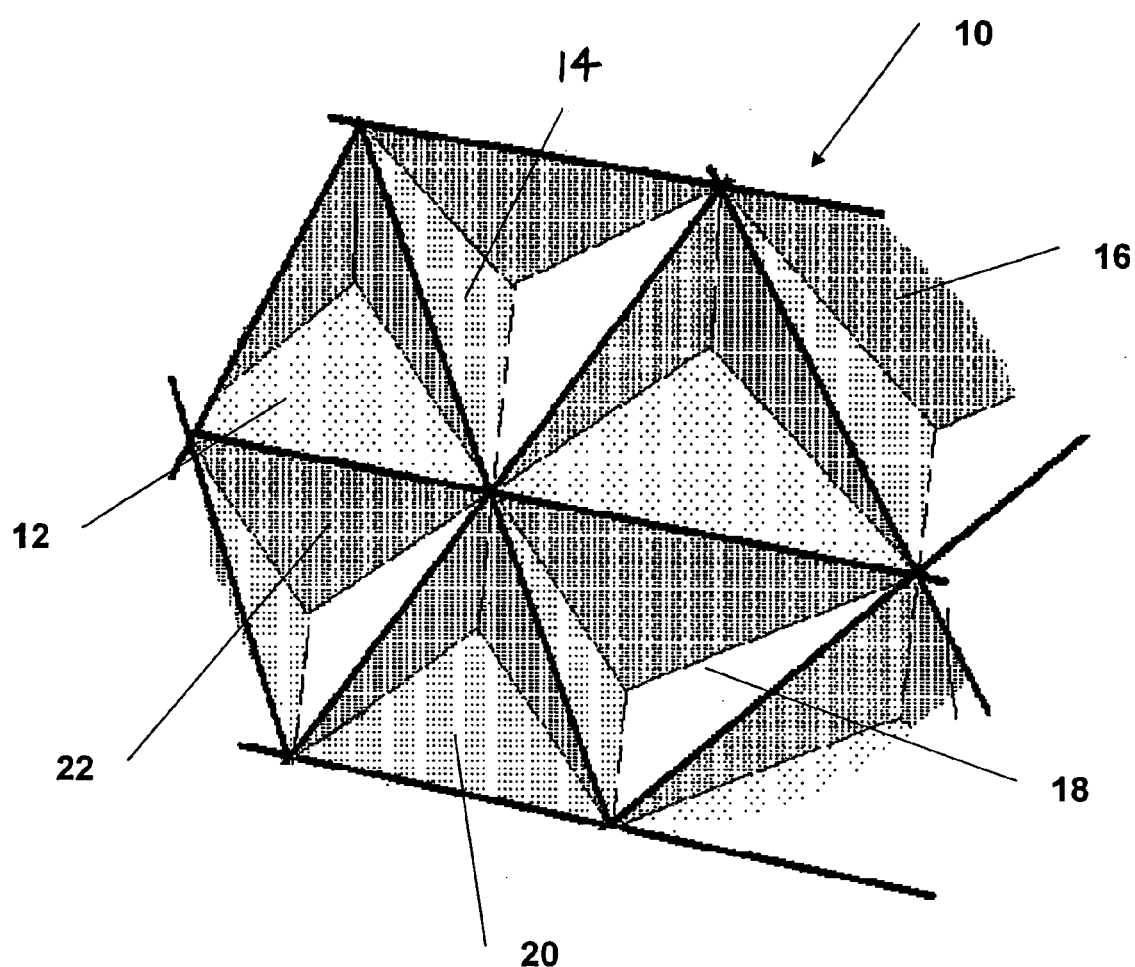
FIG. 1 illustrates a portion of a reflective surface in accordance with the present invention.

Turning now to FIG. 1, a portion 10 of a reference surface is shown. The reference surface is formed by a pattern of hollow corner cubes 12, 14, 16, 18, 20, 22 and is similar to that found in bicycle reflectors. Each surface of each of the cubes 12, 14, 16, 18, 20, 22 is silvered or aluminised to present a nominally 100% reflective surface. This ensures that a FPA (not shown) to be calibrated receives reflected light only from the cold FPA itself, the flux therefrom being small when compared with the desired flux. The temperature of the FPA is controlled at around 77K. The reflective surface is then overlaid with a uniform pattern of matt black paint with an average density of N % such that the effective emissivity is N %. The paint pattern and ideally the surface structure must be at a relatively high spatial frequency and positioned such that de-focus through the optics of the camera presents a uniform intensity at the FPA. Such an arrangement is shown in FIG. 2.

Figure 2:
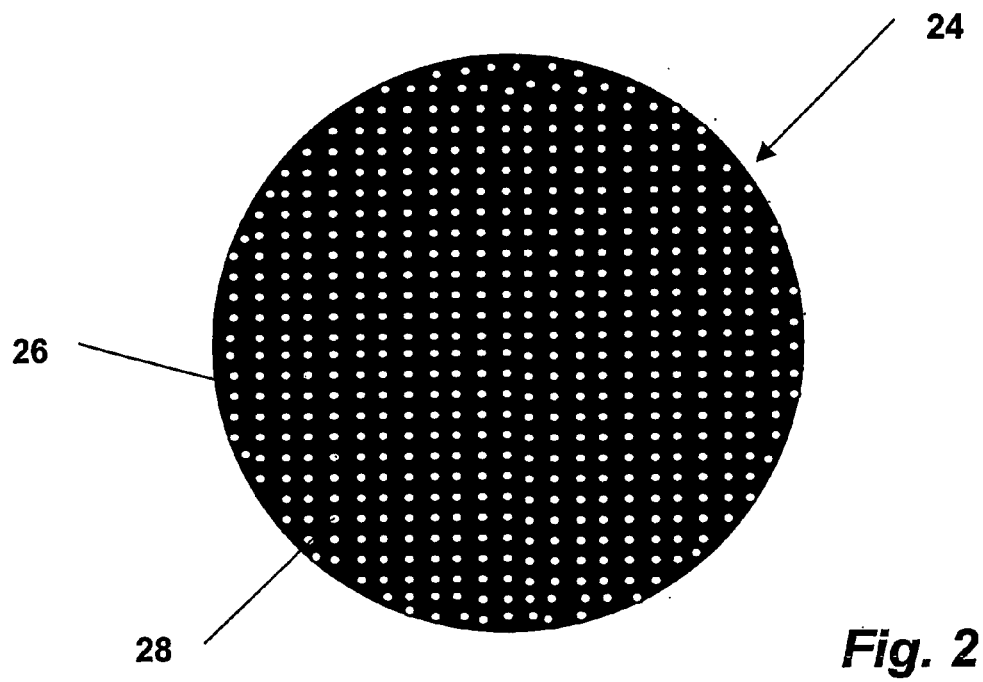
FIG. 2 illustrates a portion of one of the sectors of the reflective surface in more detail.

FIG. 2 illustrates a portion 24 of the reference surface in more detail. Here, it can be seen that matt black paint 26 surrounds a plurality of dots 28 which are effectively uncoated by the paint 26. These dots 28 are what is left of the original reflective surface after the matt black paint 26 has been applied.

After silvering, or aluminising, and subsequent painting, when viewed by a cooled IR detector the whole reference surface appears as a black body source at a temperature which is lower than the actual temperature of the reference surface. The apparent temperature is a function of the actual temperature of the reference surface, since the radiance from the matt black areas increases as they are heated. This means that the reference surface can be heated and temperature controlled to provide different equivalent reference temperatures (above 77K) for the FPA to view during calibration.

Figure 3:
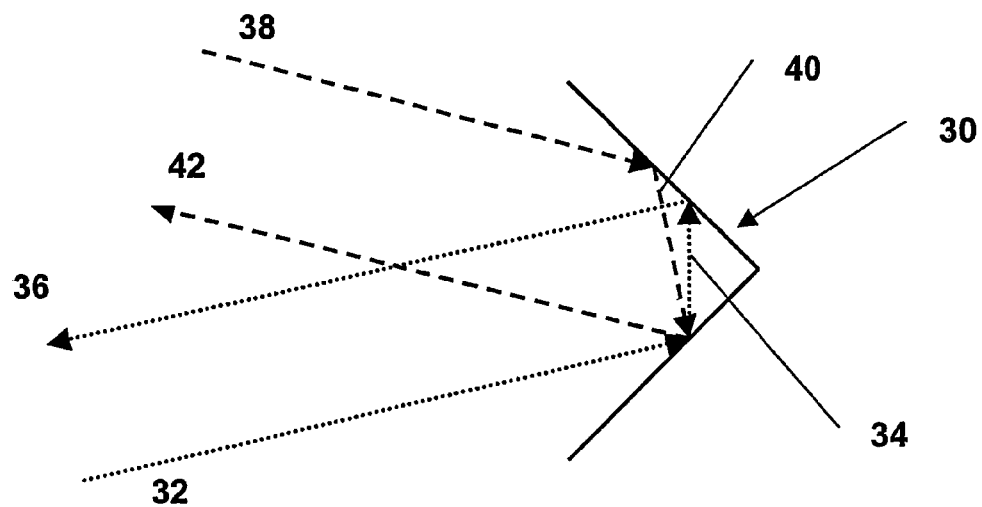
FIG. 3 illustrates the operation of a corner cube as it reflects light.

FIG. 3 illustrates a cross-section of a corner cube 30. As shown, an incoming beam on path 32 is reflected to follow path 34 and is then reflected again to follow path 36. Similarly, an incoming beam on path 38 is reflected onto path 40 and then reflected onto path 42. In both instances, a beam on the incoming paths 32, 38 is reflected by the corner cube 30 to exit on respective parallel paths 36, 42, in the opposite direction to the incoming beams. This is termed retro-reflection.

Figure 4:
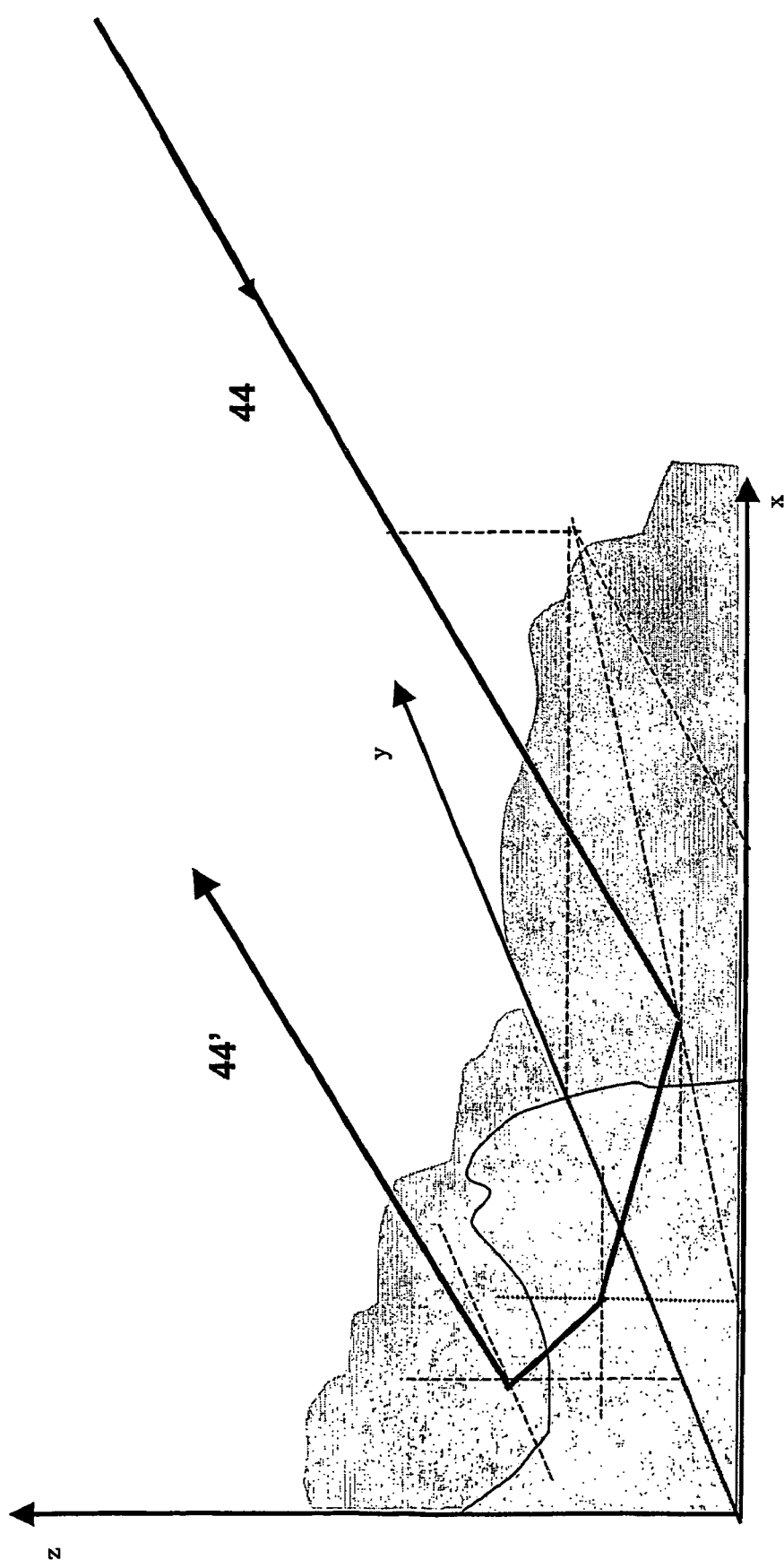
FIG. 4 illustrates an incoming beam of light being reflected by a three-dimensional corner cube.

It will readily be understood that the principles described above with reference to FIG. 3, apply to all light beams entering a three-dimensional corner cube, for example, cubes 12, 14, 16, 18, 20, 22 as described with reference to FIG. 1 above. In particular, FIG. 4 illustrates corner cube surfaces which are aligned parallel to some axes x, y, z. An incoming beam of light 44 has motion in some direction (i.e. has a velocity) with components, say $x_1, y_1, z_1$. The beam 44 is always reflected once by each of the three surfaces (x=y=0; x=z=0; and y=z=0). At each surface, the sign of the component along the normal to the surface is inverted, e.g. at the surface x=y=0, the component of velocity $z_1$ is inverted and becomes $-z_1$. The other components are not changed. After all three such reflections, the reflected beam 44' has a velocity (direction) $-x_1, -y_1, -z_1$. This is equal and opposite to that of the incoming beam 44.

In the manufacture of the reference surface described above, it is assumed that silvering or aluminising prior to painting produces a reflective surface which is more accurate geometrically, than performing this process in reverse.

As an alternative to painting, the silvered or aluminised surface can be etched to leave a non-reflective surface underneath. This will have an equivalent effect to applying a matt black paint surface.

Figure 5:
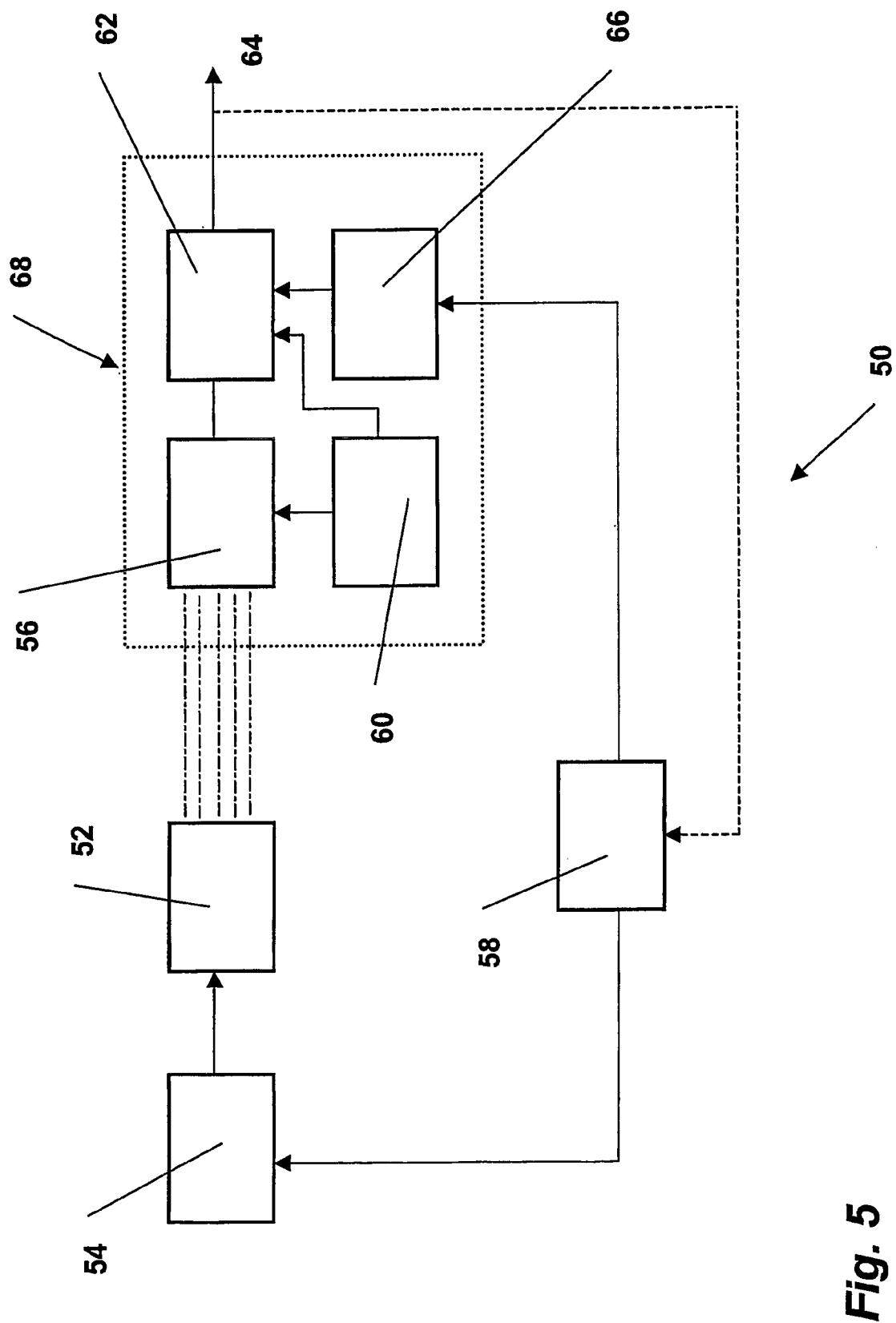
FIG. 5 illustrates a block diagram of calibration apparatus utilising a reference surface in accordance with the present invention.

FIG. 5 illustrates a calibration arrangement 50 which utilises a reference surface 52 as described above with reference to FIGS. 1 to 4. The reference surface 52 is connected to a heater unit 54 which heats it to the calibration temperatures at which an infra red camera 56 is to be calibrated. The heater unit 54 is connected to a controller 58 which controls the arrangement 50. A temperature sensor on the reference surface 52 feeds back temperature data to the heater controller 58 to maintain the temperature of the reference surface 52 thermostatically at the desired temperature. The desired temperature is defined by a processor 62, as part of the calibration sequence, and transmitted to the controller 58.

As is well known, the camera 56 is connected to a cooling control unit 60 which operates to cool the detector elements (not shown) in the camera 56, and to the processor 62 which receives signals from the camera 56, processes the signals and then provides an output 64. The processor 62 is also operable for controlling the cooling control unit 60 so that the camera 56 is maintained within its optimum operating temperature range during operation and calibration.

The processor 62 is also connected to a memory unit 66 where the calibration coefficients determined during calibration are stored.

During calibration, the reference surface 52 is positioned so as to be viewed by the camera 56. Initially, the heater unit 54 is not operational and the reference surface 52 produces a flux below the minimum required calibration flux level. This flux is principally a combination of reflected flux from the cooled detector, and the emitted flux from the emissive parts of the reference surface, which are at the internal ambient temperature of the camera. There will also be some stray flux due to imperfections in the reflectors and reflections from the camera optics, but this can be minimised by a carefully chosen design.

The heater unit 54 is then activated under the control of the controller 58 to raise the temperature of the reference surface 52 to that required to generate the minimum required calibration flux level. The camera 56 detects the flux presented by the reference surface 52, and provides signals representing the outputs of each detector element to the processor 62. As is usual, the processor 62 processes the signal and provides output 64, representing the image intensity at each part of the scene. Within processor 62 the output value from each detector element (included in processor output 64) is compared with the ideal value calculated for the current reference surface temperature. Any differences between the output value and the ideal value for each detector element are passed to the memory unit 66 for storing until needed later in the calibration process.

The heater unit 54 is then activated under the control of the controller 58 to further raise the temperature of the reference surface 52. This new elevated flux level generated by the reference surface 52 is primarily a combination of reflected flux from the camera 56 and the emissive parts of the reference surface 52 at the elevated temperature controlled by the heater unit 54. Again, within processor 62, the output value from each detector element is compared with the ideal output value for the current reference surface temperature. Any differences are again passed to the memory unit 66 for storing until needed later in the calibration process. This process is repeated for each of several calibration temperatures until the memory unit 66 contains sufficient data to calculate all the calibration coefficients necessary for the camera 56 to operate effectively. Typically such readings are taken at each of three different reference surface temperatures. The stored output errors are then used within processor 62 to calculate the coefficients of a second-order polynomial function relating output errors to scene temperature for each detector element.

It will readily be understood that, due to the construction of the references surface 52 as described above with reference to FIGS. 1 to 4 ideally the only flux reflected into the camera is that originating from the cooled components of the camera detector itself. This prevents temperatures of the environment surrounding the camera 56 from significantly interfering with the calibration process. Moreover, the temperatures of the reference surface 52 can be accurately controlled by controlling the amount of heat applied thereto by the heating unit 54.

Naturally the camera 56, cooling control unit 60, processor 62 and memory unit 66 may be housed as a single unit as shown by the dotted line 68.

It should also be noted that the method described above can be used with a reference surface which can be both heated and cooled. In this case the required degree of cooling required for the reference surface may be substantially reduced.

The invention claimed is:

1. A calibration system for an infrared detector comprising a plurality of detector elements, said calibration system comprising:

a reference surface which includes a plurality of concave corner cubes that are partially reflective and partially emissive;

temperature controlling means adapted to maintain the reference surface at a desired calibration temperature; and processing means for receiving an output signal generated by an infrared detector at said the desired calibration temperature, comparing said detector output signal for each element of said detector with a predetermined ideal output signal for said desired calibration temperature and calculating a calibration coefficient based on the difference between the detector output signal and the ideal output signal at said desired calibration temperature.

2. An infrared detector calibration system according to claim 1 wherein the emissivity of the reference surface is controlled by controlling the temperature of said reference surface.

3. An infrared detector calibration system, according to claim 1, wherein each corner cube comprises a reflective surface and a matt surface to form an effective surface having a predetermined desired emissivity.

4. An infrared detector calibration system according to claim 3, wherein the reflective surface comprises a silvered surface.

5. An infrared detector calibration system according to claim 3, wherein the reflective surface comprises an aluminized surface.

6. An infrared detector calibration system according to claim 3, wherein the matt surface comprises a matt black paint overlying the reflective surface.

7. An infrared detector calibration system according to claim 3, wherein the matt surface comprises a non-reflective surface etched into the reflective surface.

8. A method of calibrating an infrared detector comprising a plurality of detector elements using a reference surface that is characterized by partial emissivity and partial reflectivity, the method comprising:

a) presenting the reference surface at a known temperature to an infrared detector;

b) measuring the output of each detector element;

c) comparing the measured output of each detector element with a nominal output for the known reference surface temperature to determine a calibration error at the known temperature; and d) heating the reference surface to one or more further known temperatures and repeating steps b) and c) to determine a calibration error for each of the further known temperatures.

9. The method according to claim 8, further comprising the step of calculating a function relating the output error of each detector element to the temperature of the reference surface.

10. The method according to claim 9, wherein the function is a polynominal function.

11. The method according to claim 8, further comprising the step of storing the calibration constants for application to readings obtained from the detector.

* * * * *